D. R. FISHER.
MOTOR CYCLE FRAME.
APPLICATION FILED MAR. 21, 1912.
1,056,897.
Patented Mar. 25, 1913.
2 SHEETS—SHEET 1.
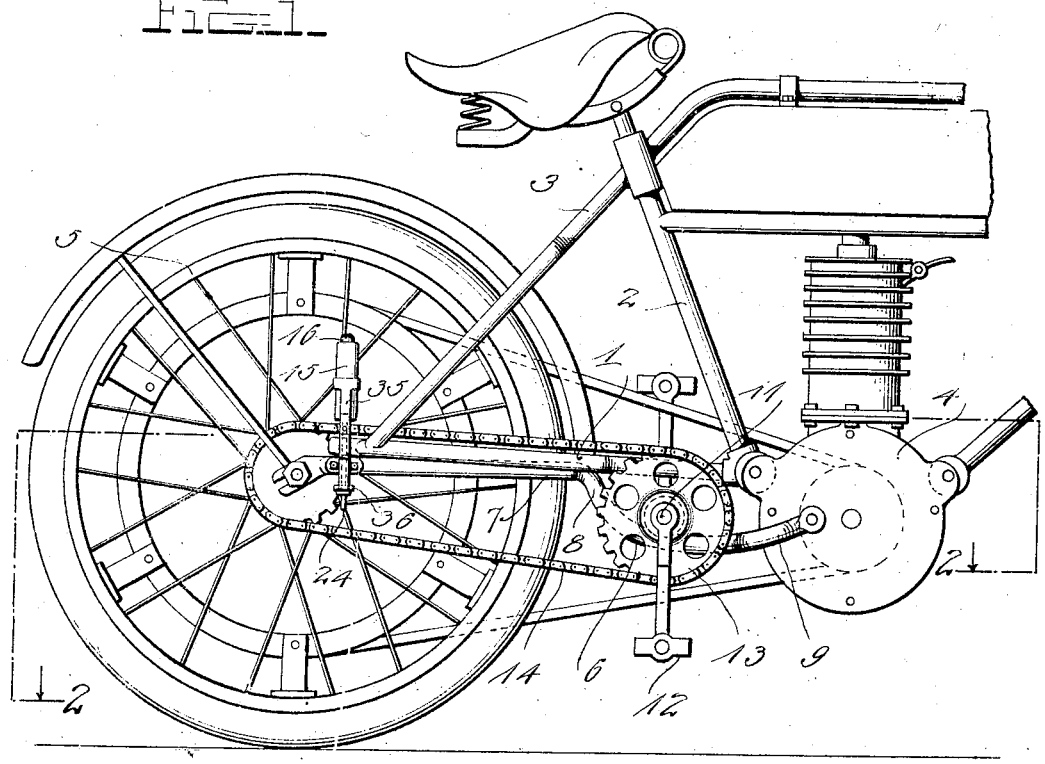
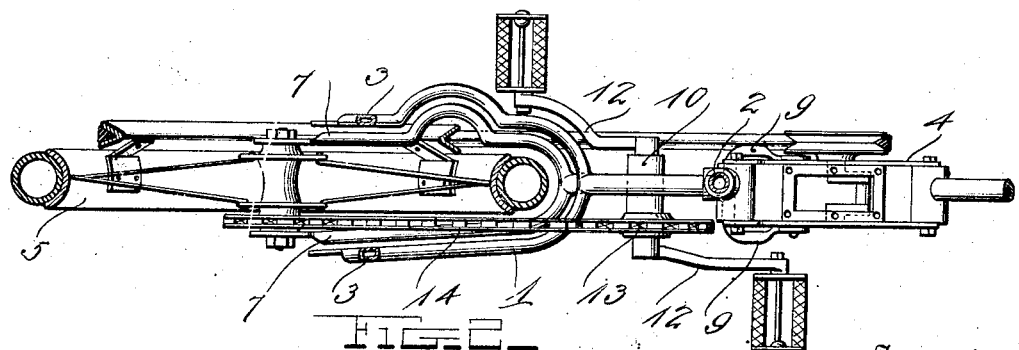
Witnesses
N. R. Pierce
C. E. Hunt
Inventor
D. R. Fisher
by H. B. Willson & Co.
Attorneys

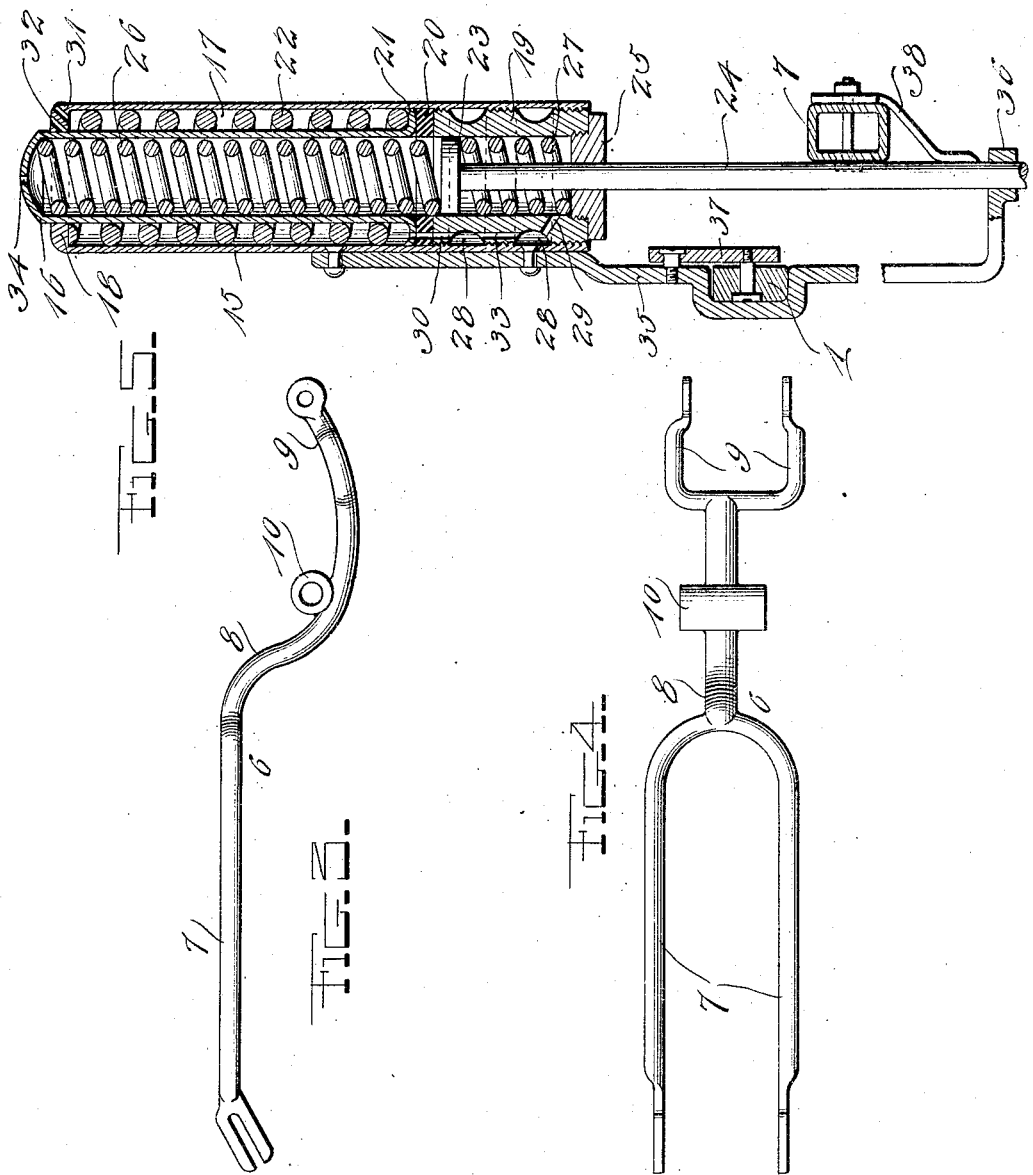

UNITED STATES PATENT OFFICE.

DANIEL REX FISHER, OF TAUGHANNOCK FALLS, NEW YORK.

MOTOR-CYCLE FRAME.

1,056,897.

Specification of Letters Patent. Patented Mar. 25, 1913.

Application filed March 21, 1912. Serial No. 685,277.

*To all whom it may concern:*

Be it known that I, DANIEL REX FISHER, a citizen of the United States, residing at Taughannock Falls, in the county of Tompkins and State of New York, have invented certain new and useful Improvements in Motor-Cycle Frames; and I do declare the following to be a full, clear, and exact description of the invention, such as will enable others skilled in the art to which it appertains to make and use the same.

This invention relates to improvements in motor-cycle frames.

One object of the invention is to provide a motor-cycle frame having an improved construction and arrangement of springs, whereby, a yielding connection is provided between the rear portion of the frame and the rear wheel thus relieving both the rider and the machine from shocks and jars which occur when the machine is passing over rough roads or obstructions.

Another object is to provide a spring frame for motor-cycles and the like which will be simple, strong, and durable in construction, efficient and reliable in operation, and which will not in any way interfere with the propelling mechanism of the motor.

With these and other objects in view, the invention consists of certain novel features of construction and arrangement of parts as will be more fully described and particularly pointed out in the appended claims.

In the accompanying drawings: Figure 1 is a side view of the rear portion of a motor-cycle frame constructed in accordance with my invention; Fig. 2 is a horizontal section on the line 2—2 of Fig. 1; Fig. 3 is a side view of the supplemental spring fork 4 removed from the machine; Fig. 4 is a plan view of the same; Fig. 5 is an enlarged vertical section of the spring connection between the supplemental fork and the rigid fork of the machine.

Referring more particularly to the drawings, 1 denotes the rigid fork, 2 the seat post, 3 the rear brace, 4 the motor casing, and 5 the rear wheel of a motor-cycle. These parts may be of the usual or any preferred construction.

Arranged in the rigid main fork 1 of the frame is my improved supplemental spring or floating fork 6, the bifurcated rear portion or arms 7 of which are disposed and work between the corresponding arms or rear portion of the rigid fork 1 and when the supplemental fork is in its normal position, the arms 7 thereof aline or are in the same horizontal plane with the adjacent portions of the rigid fork. The forward portion of the fork 6 at the point where the arms 7 join said fork is depressed or curved downwardly and forwardly as shown at 8, and said downwardly and forwardly curved portion 8 is forked or bifurcated at its outer end to form attaching arms 9 which are pivotally connected with the opposite sides of the motor casing as clearly shown in Fig. 1 of the drawings. On the downwardly and forwardly curved portion 8 of the fork 6 is formed the bearing 10 for the crank shaft 11 of the crank or pedals 12. The crank shaft 11 is provided with the usual sprocket gear 13 with which is engaged the sprocket chain 14 which connects with the rear wheel 5.

The axle of the rear wheel 5 is secured in the rear ends of the arms 7 of the supplemental fork in the usual or in any suitable manner and said arms 7 of the supplemental fork are connected to the ends of the arms or bars of the main or rigid fork 1 by a spring connection now to be described.

The spring connection between the main and supplemental forks comprises an outer cylinder or spring casing 15 in which is arranged and slidably mounted an inner cylinder or spring casing 16, said inner cylinder being of less diameter than the outer cylinder to provide between the cylinders a space 17. The upper end of the inner cylinder or casing projects and works through the upper end of the outer cylinder, said upper end of the outer cylinder being closed around the inner cylinder by a reinforced or thickened flange 18 as shown. Screwed into the lower end of the outer cylinder 15 is a plunger cylinder 19 on the inner end of which is arranged a buffer ring or cushion 20 of rubber or other suitable material with which the inner end of the inner cylinder 16 is engaged, said inner end of the cylinder 16 having thereon an outwardly projecting annular flange 21 which is slightly curved and forms a seat for the lower end of the coil spring 22 which is arranged in the space 17 between the inner and outer cylinders and has its upper end engaged with the reinforced flange 18 on the upper end of the outer cylinder as shown.

The inner surface of the plunger cylinder 19 has the same diameter as and is flush with the inner surface of the inner cylinder 16 and slidably mounted in the plunger cylinder 19 is a plunger 23, the head of which has a close sliding engagement with the inner surface of the cylinder and the stem or rod 24 of which engages a bushing 25 secured into the outer end of the plunger cylinder 19 as shown. Between the head of the plunger 23 and the closed outer end of the inner cylinder or spring casing 16 is arranged a coil spring 26 which is somewhat lighter and more yielding than the spring 22 in the space 17 between the inner and outer cylinders or spring casings. Also arranged in the plunger cylinder 19 between the plunger head and the bushing 25 is a short coiled spring 27 which acts as a buffer for the plunger which prevents the plunger head from bumping against the bushing 25 when the plunger returns to its normal position.

In the outer surface of the plunger cylinder 19 are formed annular grooves or recesses 28 which provide oil chambers or reservoirs and which are connected by oil ducts 29 with the inner side of the cylinder and thus lubricate the same which causes the plunger head to slide smoothly in the cylinder. In the upper end of the plunger cylinder are also formed oil passages or ducts 30. In the reinforced flange 18 forming the upper end of the outer cylinder or spring casing 15 are oil holes 31 and 32, the oil hole 31 communicating with the space 17 between the cylinders or casings, while the hole 32 communicates with the inner side of the flange 18, whereby oil may be introduced between the engaging surfaces of said flange and the inner spring cylinder or casing 16. The oil hole 31 is provided to permit oil to be introduced into the space 17 from which it is conducted through the oil ducts 30 to the upper groove or oil chamber 28 in the plunger cylinder and from said upper chamber flows through connecting ducts 33 to the lower chamber in said plunger thus keeping said chambers supplied with oil which is fed to the inner side of the plunger cylinder and plunger in the manner described. In the outer end of the inner spring casing or cylinder 16 is also formed an oil hole 34 through which oil may be introduced into said cylinder or casing for lubricating the spring 26 therein.

To one side of the outer cylinder or spring casing 15 near its lower end is secured the upper end of a combined fork attaching plate and plunger rod guide 35 on the lower end of which is arranged a guide collar 36 with which the lower end of the plunger rod 24 is slidably engaged. The plate 35 is offset to a slight extent between the lower end of the cylinder and the collar 36 and to said offset portion of the plate is secured the rear end of one member of the rigid fork 1, the other member of said fork being secured to the plate 35 of the spring connection on the opposite side of the rear wheel, it being understood, of course, that one of the spring connections herein described is provided on each side of the rear wheel. The ends of the arms or bars of the fork 1 are secured to the plates 35 of the spring casings by connecting plates 37 which are pivotally secured to the plates 35 above the offset portion therein as clearly shown in Fig. 5 of the drawing. The ends of the fork members 1 when thus attached to the plates 35 will rest in and loosely engage the offset portions of the plates 35, said offset portions thus forming seats for the ends of the fork. The floating fork 7 when taking up a jolt or jar will move in the arc of a circle and this movement will tend to draw the spring retainer ahead to a slight extent. By pivotally attaching the connecting plate of the fork 1 to the plate 35 of the spring retainer this slight movement of the latter will be permitted. In other words, the pivotal connection between the connecting plate of the main fork of the machine and the attaching plate 35 will permit the movement of the parts without causing the plunger rod or plunger to bind in the spring casing. The rear ends of the supplemental or floating fork of the machine are connected to the plunger rods 24 of the spring connections by brackets 38 which are preferably welded or secured to the plunger rods in such manner that said rods will not be weakened.

It will thus be seen that by providing a spring connection constructed and arranged as herein shown and connecting thereto the ends of the main and supplemental or floating forks of the machine in the manner described, that all jolting or jars occasioned by the passage of the rear wheel over rough surfaces or obstructions will be absorbed by the springs of the connections, thus relieving the rider as well as the machine from such jars or jolts. In absorbing or taking up the jolts or jars the lighter spring 26 will absorb the light shocks and the first part of the heavier shocks and the outer or heavier spring 22 will absorb or sustain the heavier shocks and jars thus reducing the racking and general wear and tear of the machine occasioned by travel over rough roads.

It will be noted that the pivotal connection of the floating fork is disposed so close to the engine shaft that the tendency of the drive belt or chain to loosen is reduced to a minimum.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

I claim as my invention:

1. In a motor-cycle frame, a main or rigid fork, a floating supplemental fork comprising rear arms between the arms of the main fork and having a forwardly projecting bifurcated end embracing the motor and pivoted thereto, a bearing on said forward portion of the supplemental fork, means to connect the rear ends of the supplemental fork to the axle of the rear wheel, a plunger cylinder, a plunger therein, a casing inclosing said cylinder, springs in said casing and cylinder, a rod projecting from the plunger, connections between the rod and the supplemental fork, and a plate connecting the cylinder with the main fork.

2. In a motor-cycle frame, a main or rigid fork, a floating or supplemental fork pivotally connected at its forward end to a rigid part of the frame and having its rear end disposed and adapted to swing between the arms of the main fork of the frame, said supplemental fork having its rear ends engaged with the axle of the rear wheel of the machine, a crank shaft bearing arranged on the floating supplemental fork near its forward end, a spring connection between the rear ends of the supplemental fork and the main rigid fork of the machine, said spring connection comprising a plunger cylinder, a plunger slidably mounted therein and connected to the rear end of one arm of the supplemental fork, spring casings arranged on said plunger cylinder and connected to the rear end of one arm of the main fork of the frame, and springs in said casings and engaging said plunger, thereby forming a yielding connection between the forks.

3. In a motor-cycle frame, a main or rigid fork, a floating supplemental fork pivotally connected at its forward end to a stationary part of the frame and having its rear end disposed and adapted to swing between the arms of the main fork of the frame, said supplemental fork having its rear ends connected with the axle of the rear wheel, a spring connection between the rear end of the supplemental and main forks of the frame, said spring connection comprising an outer casing, a plunger cylinder arranged in the lower end of said outer casing, an inner spring casing slidably mounted in and projecting through the upper end of said outer casing, said inner casing having a closed outer end and said outer casing having on its outer end an annular flange, a plunger slidably mounted in said plunger cylinder, a spring arranged between said plunger and the end of the inner cylinder, a heavier spring arranged between the inner end of the plunger cylinder and the flange on the outer end of the outer casing, a bushing arranged in the outer end of said plunger cylinder, a buffer spring mounted between the head of the plunger and said bushing, means for attaching said outer spring casing to the main fork of the frame and means for connecting said plunger to the supplemental or floating fork of the frame, whereby, a yielding connection is provided between said forks.

4. In a motor-cycle frame, a main or rigid fork, a floating supplemental fork comprising parallel rear arms between the arms of the main fork and having a downwardly curved forwardly projecting portion provided with a bifurcated end adapted to embrace the opposite sides of the motor and to be pivotally connected thereto, a crank shaft bearing arranged on said downwardly curved portion of the supplemental fork, means to connect the rear ends of the supplemental fork to the axle of the rear wheel of the machine, a spring connection between said supplemental fork and the main fork of the frame, said spring connection comprising a plunger cylinder, a plunger slidably mounted therein, spring casings arranged on said cylinder, springs within said cylinder and connected with said plunger whereby a yielding resistance is applied to the plunger, a fork attaching plate secured at one end to the outer spring casing of the plunger cylinder, a guide collar arranged on the opposite end of said plate, a plunger rod projecting from the plunger in said plunger cylinder and having a slidable engagement with said collar, a bracket secured to said plunger rod and adapted to be engaged with the supplemental fork, and a clamping plate to connect the fork attaching plate on the outer cylinder with the main fork of the frame.

In testimony whereof I have hereunto set my hand in presence of two subscribing witnesses.

DANIEL REX FISHER.

Witnesses:
  Geo. H. Fowler,
  F. R. Smith.